US009843220B2

(12) United States Patent
Herrmann et al.

(10) Patent No.: US 9,843,220 B2
(45) Date of Patent: Dec. 12, 2017

(54) METHOD AND APPARATUS FOR OPERATING AN INTERNAL CHARGER SYSTEM OF A PORTABLE ELECTRONIC DEVICE

(71) Applicant: MOTOROLA SOLUTIONS, INC., Schaumburg, IL (US)

(72) Inventors: John E. Herrmann, Suwanee, GA (US); Peter J. Bartels, Loxahatchee, FL (US); Michael D. Geren, Suwanee, GA (US); Roy L. Kerfoot, Jr., Lilburn, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 165 days.

(21) Appl. No.: 14/607,651

(22) Filed: Jan. 28, 2015

(65) Prior Publication Data

US 2016/0218539 A1    Jul. 28, 2016

(51) Int. Cl.
*H02J 7/00*       (2006.01)
*H02J 9/00*       (2006.01)

(52) U.S. Cl.
CPC .............. *H02J 9/002* (2013.01); *H02J 7/008* (2013.01); *H02J 2007/006* (2013.01); *H02J 2007/0062* (2013.01)

(58) Field of Classification Search
CPC ...................................... H02J 9/002
USPC ...................................... 320/107
See application file for complete search history.

(56) References Cited

U.S. PATENT DOCUMENTS

| | | | |
|---|---|---|---|
| 6,861,824 B1* | 3/2005 | Liu ....................... | H02J 7/0068 320/137 |
| 7,282,814 B2 | 10/2007 | Jacobs | |
| 7,449,862 B1 | 11/2008 | Voor et al. | |
| 7,893,678 B2 | 2/2011 | Blanken | |
| 7,994,756 B2 | 8/2011 | Rowland | |
| 8,159,185 B2 | 4/2012 | Hayashi | |
| 8,319,471 B2* | 11/2012 | Adest ..................... | H02J 7/0063 257/140 |
| 8,339,095 B2 | 12/2012 | Hayashi | |
| 8,760,119 B2 | 6/2014 | Winger et al. | |
| 8,766,600 B2 | 7/2014 | Hussain et al. | |
| 8,823,340 B2 | 9/2014 | Chen et al. | |
| 2004/0113585 A1* | 6/2004 | Stanesti ................ | H02J 7/0018 320/116 |
| 2010/0231184 A1 | 9/2010 | Wei et al. | |
| 2011/0133700 A1* | 6/2011 | Martin ................... | H02J 9/061 320/145 |

(Continued)

FOREIGN PATENT DOCUMENTS

CA        2746761 A1     1/2013

*Primary Examiner* — Suresh Memula

(74) *Attorney, Agent, or Firm* — Barbara R. Doutre; Scott M. Garrett

(57) ABSTRACT

An internal charging system controls charging of a battery used to power an electronic device when an external power source is connected to the device. The internal charging system can charge a battery that has a higher operating voltage than the voltage provided by the external power source. While charging the battery from the external power source, an internal charge controller can operate and inhibit functions of the device to indicate to user that a charging operation is commencing, and to prevent operation of the device when the battery voltage is too low to support such operation.

8 Claims, 4 Drawing Sheets

(56) References Cited

U.S. PATENT DOCUMENTS

| | | | |
|---|---|---|---|
| 2012/0025752 A1 | 2/2012 | Teggatz et al. | |
| 2013/0154550 A1 | 6/2013 | Balmefrezol et al. | |
| 2015/0318727 A1* | 11/2015 | Vogel | H02J 7/027 320/107 |
| 2016/0046199 A1* | 2/2016 | Butler | B60L 11/1846 320/106 |
| 2016/0087474 A1* | 3/2016 | Tallada | H02J 7/0054 320/103 |

\* cited by examiner

METHOD AND APPARATUS FOR OPERATING AN INTERNAL CHARGER SYSTEM OF A PORTABLE ELECTRONIC DEVICE

FIELD OF THE DISCLOSURE

The present disclosure relates generally to portable electronic devices that are powered by a rechargeable battery, and more particularly to portable electronic devices that include an internal charging system that can be powered through a standardized data connector to charge the battery, and a set of dedicated charger contacts to alternatively allow an external charger to charge the battery or, for calibration/reconditioning, discharge the battery.

BACKGROUND

Portable electronic devices are often powered by a rechargeable battery when the electronic device consumes power at a rate that makes the use of primary (non-rechargeable) battery cells cost prohibitive. Common examples of such devices are communication devices, such as cellular telephones and portable two-way radios. Operating radio and other circuitry in these types of devices requires a substantial amount of energy over time, such that primary battery cells would be depleted so often as to make use of primary battery cells impractical.

However, the use of rechargeable batteries requires a battery charger. In older systems, a battery (hereafter referring to a battery pack including one or more rechargeable battery cells) would have to be removed and connected to a charger, or the battery would be provided with external charger contacts, in addition to device contacts for powering the device, so that a charger could charge the battery while it was connected to the device. In more recent years, as technology has advanced, devices have been designed to include some, if not all of the charging function in circuitry in the device. By including charging circuitry in the device, an external power source can be connected to the device, and power from the power source can be controlled by the charging circuitry in the device to charge the battery while it is connected to the device (often even disposed inside a housing of the device).

A common means of providing power to an internal charger system is through a connector such a universal serial bus (USB) connector. There are several standards published by the USB Implementers Forum (USB-IF) that specify various electrical and mechanical parameters and features as to the form factor of the connectors as well as the electrical operation of signals over conductors contained within such connectors. Most standardized USB connections, however, are limited to a five volt power supply. For devices that are powered by, for example, a single lithium ion battery cell, which has a nominal maximum operating voltage of about 4.2 volts, a USB connection can be used to charge the single cell battery. However, in some applications, the device is designed to operate at a higher voltage, and the battery used to power the device includes series-connected battery cells producing a battery voltage that is greater than the five volts provided by a USB connection.

Accordingly, there is a need for a method and apparatus for an internal charger system for a portable electronic device that avoids the problems associated with the prior art and allows charging from an external power source through a standardized data connector when the battery voltage exceeds the voltage provided by the external power source.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
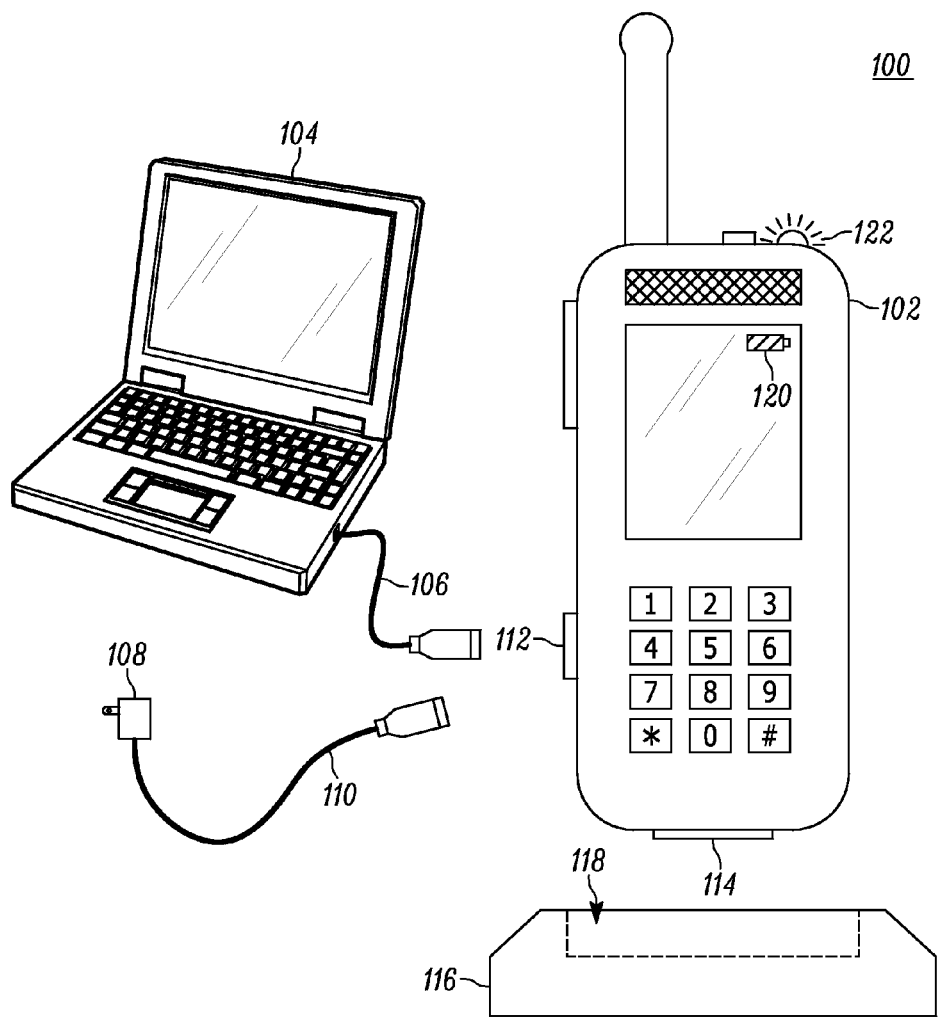
FIG. 1 is a system diagram of a device and charging sources, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include an internal charger system for an electronic device that includes, among other things, a charge controller that determines a maximum current output of an external power source connected to the electronic device at a standardized data connector. The internal charger system can further include a direct current (DC) to DC single-stage regulator coupled to the standardized data connector that generates a charging current from the external power source at a charging voltage. The charging current is based on the determined maximum current output of the external charging source and the charging voltage is based on voltage of a battery connected to the electronic device. The internal charger system can further include the charge controller being coupled to the single stage DC to DC regulator to control the single stage DC to DC regulator to charge the battery connected to the electronic device at the charging voltage and selected current rate according to a charge regime.

FIG. 1 is a system diagram 100 of a device 102 and charging sources, in accordance with some embodiments. The device 102 contains, or has an attached rechargeable battery that is used to power the device 102. The device 102 can be any portable electronic device, including, for example, a portable two-way radio device, or a cellular telephone device. One way to recharge the battery is to place the device with the battery in an external charger 116. The external charger 116 can be a single unit charger or a multi-unit charger. The external charger 116 has electrical contacts that mate with charger contacts 114 to charge the battery, and includes a processor and other circuitry to control charging of the battery under various circumstances. Typically an external charger has a pocket 118 into which the device 102, with the battery, can be placed. Mechanical features in the pocket 118 correspond with the form of the device 102 and battery to guide the device and battery into correct alignment so that the contacts of the external charger 116 and the charging contacts 114 make contact.

The device 102 also includes a standardized data connector 112, such as a USB connector to allow a second way of charging the battery. At least two types of external power sources can be connected to the standardized data connector 112, including another device 104, such as a computer having a corresponding data connector, which can be connected via a cable 106. A dedicated power source 108 can likewise be connected to the standardized data connector 112 of the device 102 using a corresponding cable 110. The dedicated power source 108 can provide more current, and at the same standardized voltage, as the other device 104. The dedicated power source 108 can indicate the availability of the higher level of current such as by shorting data lines of the cable 210 together, which can be detected by the internal charge controller of the device 102. For standardized USB connections, a dedicated power source is able to provide up to 1.5 amperes, while a device such as the other device 104 may source only 0.1 amperes of current nominally, and where digital communications can increase the current to 0.5 amperes, typically.

The device 102 can include a battery status icon 120 that is updated according to the charge state of the battery. As the battery is charged or discharged, the battery status icon 120 can be changed accordingly to indicate an approximate charge state of the battery. In some embodiments, when the battery voltage is too low to allow turning on the device 102, the battery status icon 120 can remain off, but a LED 122 can be enabled to indicate that some charging activity is occurring, and that the battery voltage is such that it requires an initial charging regime to "rehabilitate" the battery back to a state where a normal charge regime can be used.

Figure 2:
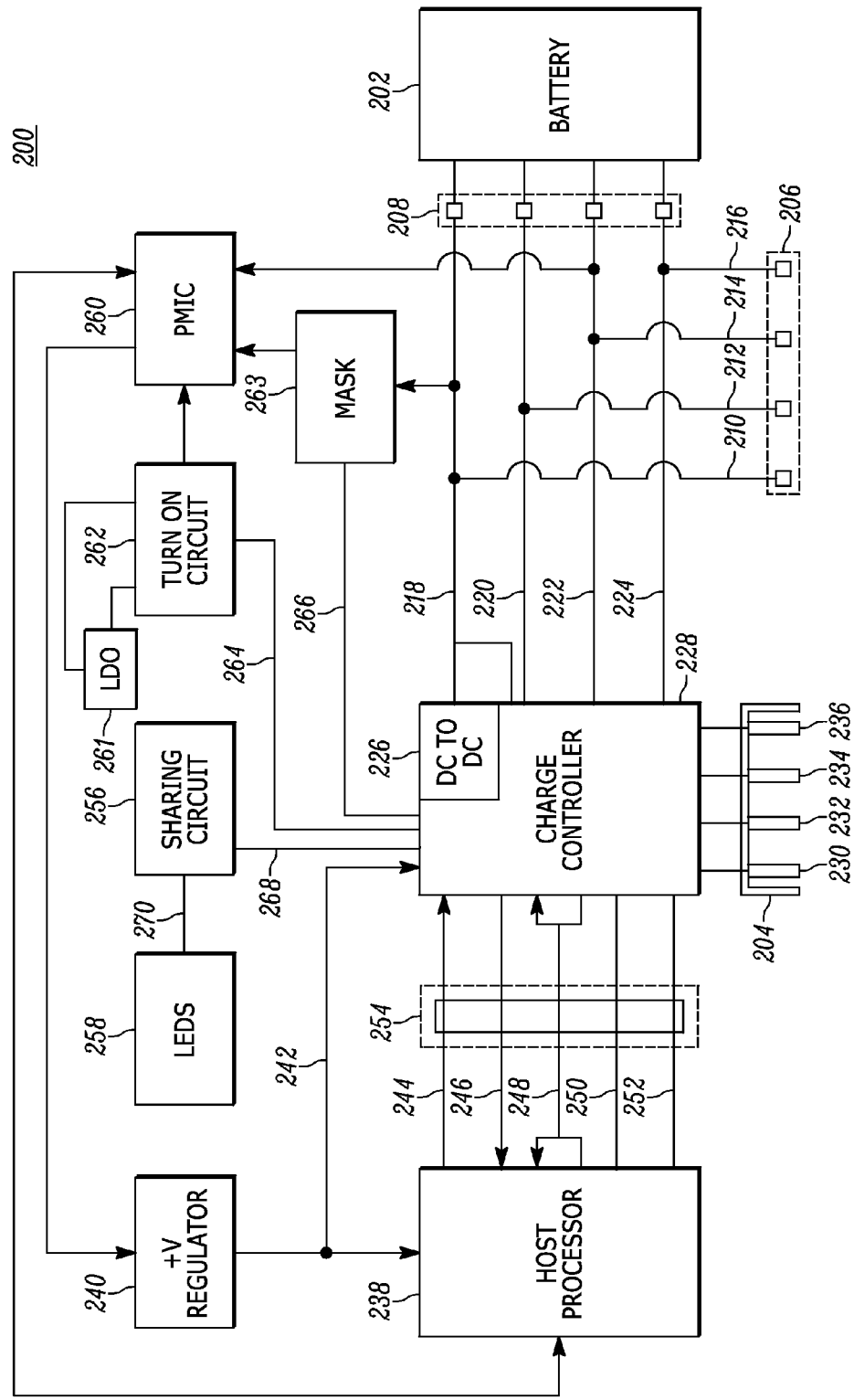
FIG. 2 is a block schematic diagram of a device having an internal battery charging system in accordance with some embodiments.

FIG. 2 is a block schematic diagram of a device 200 having an internal battery charging system in accordance with some embodiments. The internal battery charging system charges a battery 202 that is either connected to the device 200 (i.e. as a detachable battery pack) or that is more permanently mounted inside the device 200. In general, the device 200 includes a standardized data connector 204 that can be, for example, a universal serial bus (USB) connector as standardized by the USB Implementers Forum (USB-IF). The device 200 can be charged through the standardized data connector 204, or charged or discharged through an external set of charger contacts 206 that can be disposed either on the device or on a detachable battery pack that includes battery 202, and that connects to the device 200 through a set of battery contacts 208. When the battery 202 is charged through the charger contacts 206, the external charger is responsible for charging the battery 202 (i.e. applying a correct charge regime). The charger contacts 206 include contacts connected to a positive (B+) line 210, a negative line 216, and can further include additional contacts for lines such as a thermistor line 212, and a data line 214 for communicating with a memory device in the battery 202.

When the battery 202 is charged by an external charger through the charger contacts 206, the external charger provides current through the B+ line 210 which is connected to an internal positive battery line 218, and current can flow into the battery 202, and return on line 224, which is connected to the negative line 216, to return to the external charger. The external charger can also monitor battery voltage between lines 210, 216, as well as temperature via the thermistor line 212, which is connected to an internal thermistor line 220. Data in the battery can be accessed over the data line 214, which is connected to the internal data line 222. The data can be stored in a memory device in the battery 202, and can indicate the type of battery chemistry of the battery cell or cells, and other information such as, for example, manufacturer, cycle life, present charge state, and so on.

An internal charge controller 228 can monitor battery charging while being charged by the external battery charger through the charger contacts 206. The internal charge controller 228 is connected to lines 218, 220, 222, 224 which allows the internal charge controller to monitor charging and discharging. The internal charge controller 228 does not control the charging process when the external charger is connected to the charger contacts 206 since charging is controlled by the external charger. However, the charge state of the battery 202 can be provided by the internal charge controller 228 to the host processor 238 when the battery 202 is being charged by an external charger. For example the internal charge controller 228 and host processor 238 can communicate using a pair of universal asynchronous receive/transmit (UART) lines 244, 246, in conjunction with a UART attention in/out line 248. The internal charge controller 228 can send data on UART line 246 to the host processor 238 while the host processor 238 can transmit data to the internal charge controller 228 over UART line 244. A reset line 250 and programming enable line 252 can be further used to program the internal charge controller 228. The host processor 238 and the internal charge controller 228 may operate at different voltage levels, since the internal charge controller 228 may need to operate at a high voltage to provide sufficient resolution on analog-to-digital input convertors, and as such the UART signals on lines 244, 246, 248, 250, and 252 may need to be level-shifted through a level shift block 254. The level shift block shifts voltage levels on UART lines 244, 246, 248, 250, and 252 to a proper voltage level for the host processor 138 and the internal charge controller 228.

The battery 202 can, alternatively, be charged through the standardized data connector 204, in which case the internal charge controller 228 controls charging by applying an appropriate charge regime. A charge regime is a charging algorithm that specifies charging parameters such as voltage and current limits, determination of end of charge conditions, and so on, as is well known in the art. A typical standardized data connector 204 can contain, for example, a positive contact 230, a negative contact 236, a data positive contact 232, and a data negative contact 234. Upon a data plug (see FIG. 1, 106 or 110) being connected to the standardized data connector 204, a voltage will be presented between the positive and negative contacts 230, 236. The voltage provided by the data plug allows the internal charge controller 228 to detect the connection of the data plug to the data connector 204. The internal charge controller 228 is programmed to handle the various charging conditions and includes a single stage direct current (DC) to DC regulator 226 that regulates charging of the battery. The single stage DC to DC regulator 226 is either a switching regulator using a single inductive current regulating component, or a linear regulator using a pass transistor to regulate charging current (and/or charging voltage). A single stage DC to DC regulator can be, in some embodiments, a single stage buck/boost regulator using a single inductor to achieve both boost and buck operation.

In a first exemplary mode, the device 200 can be turned on and operating normally when a power source is connected to the standardized data connector 204. Accordingly, upon detecting connection of the power source at the standardized data connector 204, the internal charge controller 228 first determines the current or power that is potentially available such as by determining whether the data lines 232, 234 are shorted together (in the connecting power source). In some embodiments the power source may indicate the current level available in other ways, such as by presenting a circuit configuration uniquely identifiable by the host processor 238. Upon determining the available current, the host processor 238 can communicate available current to the internal charge controller 228. The internal charge controller 228 can configure the single stage DC to DC regulator 226, accordingly. The single stage DC to DC regulator 226 regulates current from the power source connected at the standardized data connector 204 to charge the battery 202, and is either a switching regulator using a single inductive element for current regulation, or is a linear regulator. In some embodiments the voltage of the battery 202 can be higher than the voltage provided by the power source connected to the standardized data connector 204, and so the single stage DC to DC regulator can be configured as a single stage buck/boost regulator (i.e. having one current regulating inductor) that can generate a higher output voltage (on internal battery positive line 218) than that available from the power source connected to the standardized data connector 204. For example, if the battery 202 uses two lithium ion cells connected in series, it will have an upper operating voltage on the order of 8.4 volts, while a USB power source provides 5 volts regardless of whether it is a dedicated power source or not. Accordingly, to charge such battery, the single stage DC to DC regulator 226 must be capable of a boost mode of operation in such embodiments. In some embodiments the battery 202 is such that its voltage is never larger than the voltage provided at the standardized data connector 204, and hence the single stage DC to DC regulator can be a buck or linear type regulator that uses a buck mode for high current operation, and a linear mode when the battery voltage is close to (but below) the voltage supplied at the standardized data connector 204 and the current is relatively low (as in "trickle" charging mode). The internal charge controller 228 controls the single stage DC to DC regulator 226 to output appropriate current and voltage to charge the battery 202, based on the available current that can be sourced from the power source connected to the standardized data connector 204, and in accordance with an appropriate charge regime. Various charge regimes can be stored in the internal charge controller 228 for different types of batteries, and the internal charge controller 228 can select an appropriate or corresponding charge regime from among those stored in the internal charge controller 228. In some embodiments the battery 202 can contain data indicating a charge regime in a memory (i.e. accessed via data line 322) which can be retrieved and implemented by the internal charge controller 228.

The host processor 238 is powered by a voltage regulator 240. When the device 200 is turned on, power is provided to the voltage regulator 240, which results in a regulated voltage being provided to the host processor 238 by the voltage regulator 240. Likewise, when the device 200 is turned off, voltage to voltage regulator 240 is removed, causing the voltage on line 242 to drop, which can be detected by the internal charge controller 228. While the internal charger controller 228 or an external charger is charging the battery 202, detecting the voltage on line 242 being off, or being turned off, the internal charge controller 228 may command device 200 to a limited turn-on state to display battery status data or an icon. The limited turn-on state can be invoked via the turn-on circuit 262, which is connected to the power management integrated circuit (PMIC) 260. The PMIC 260 is further connected to the +V regulator 240, which is further connected to the host processor 238. The limited turn-on state can give the user some indication of charge status and progress without engaging unnecessary functions that may extend charge time. The internal charge controller 228 can update the host processor 238 on the charging status or state of charge of the battery 202 over the UART lines (i.e., 244, 246, 248). The host processor 238 can display battery status icons or information on a graphical or other display of the device 200.

In the case where the battery 202 has a very low voltage that requires a special initial charging regime to bring the voltage up to a level that will allow regular charging, the voltage may be too low to allow the device to be turned on. It can even be too low to allow proper operation of the PMIC 260. Thus, when a power source is connected to the standardized data connector 204, and the battery voltage is below a low voltage threshold, the internal charge controller 228 enables a mask circuit 263 that interrupts the device power switch to prevent PMIC 260 turn-on when the user presses or actuates the device power switch. Thus the internal charge controller 228 and necessary other circuits (e.g., turn on circuit 262, mask 263, LED sharing circuit 256, switching circuit connecting the battery 202 to an external charger via contacts 206) are independently powered (e.g., via low drop out (LDO) regulator 261) from the battery 202, an external charger (i.e., 210, 216), or the data connector 204 (i.e., 230, 236). As a result, the charge controller 228 may perform its functions regardless of device 200 being turned on or turned off. Furthermore, in some embodiments, in order to provide the user with some indication that some charging activity is occurring (e.g., during low battery charging when other device 200 circuitry are prevented from being turned on), a light emitting diode (LED) sharing circuit 256 is enabled via line 268 to cause one or more LEDs 258 of the device 200 to turn on via line 270, giving a user a visual indication that battery charging is in progress, even though the device cannot be turned on since the mask circuit 263 is enabled. After the internal charger controller 228 or the external charger has charged the low-voltage battery 202 to a sufficiently high voltage (i.e. above a low voltage threshold), the internal charge controller 228 can remove the power switch mask asserted by the mask circuit 263, discontinue sharing the LED (i.e., 256 and 258), and command device 200 into the limited turn-on state where the host processor displays battery status data or an icon (i.e., via the turn-on circuit 262, connected to the PMIC 260, which enables the +V regulator 240 to power the host processor 238). In the limited turn-on state the user can have some indication of charge status and progress without the device 200 engaging unnecessary functions that may extend charge time.

Figure 3:
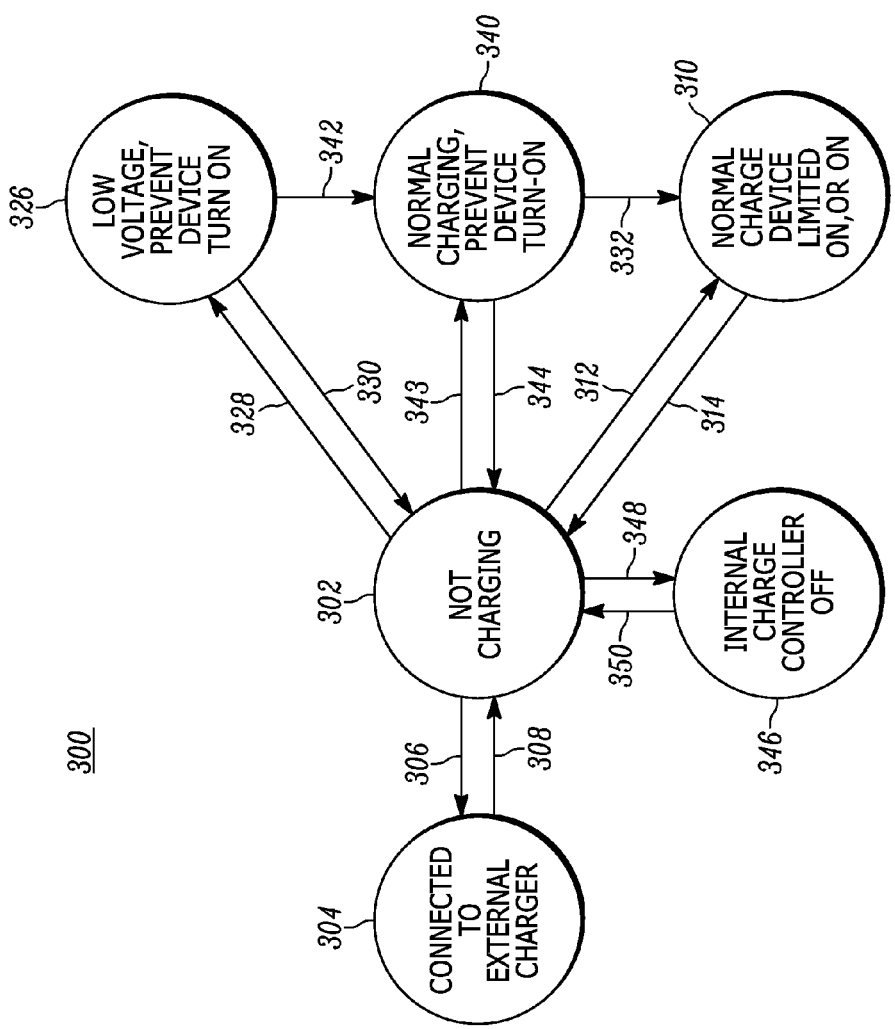
FIG. 3 is a state diagram of an internal charging system in accordance with some embodiments.

FIG. 3 is a state diagram 300 of an internal charging system in accordance with some embodiments. In general, the state diagram 300 describes some exemplary states of operation of a portable device having an internal charging system and internal charge controller for charging an attached (or embedded) battery. In general, the device includes a standardized data connector such as, for example, a USB connector through which the internal charging system can receive power from an external power supply to charge the battery. The battery can also be charged, alternatively, by an external battery charger. The state diagram 300 can be an example of an internal charging system such as that illustrated in FIG. 2. In state 302, no charging is occurring, either from an external charger or controlled by the internal charge controller as powered by an external power source connected to the standardized data connector. In state 304, the device and battery are connected to an external charger, as indicated by transition 306. The external charger charges (or discharges) the battery through charger contacts, and the internal charge controller monitors charge state to inform the host processor. The state can revert back to state 302 by removing the device from the external charger, indicated by transition 308.

In state 310 the device is connected to a power source through a standardized data connector such as a USB connector, and is charging the battery using current sourced by the external power source. Charging is controlled by the internal charge controller which controls a single stage DC to DC regulator based on the current that can be sourced by the external power source and the state of charge of the battery. The internal charge controller can determine the amount of current that can be sourced by the external power supply and control the single stage DC to DC regulator accordingly. The state can transition from state 302 to state 310 by connecting the external power source, as indicated by transition 312, and can transition back to state 302 by disconnecting the external power source.

In some cases the battery can be over-discharged, and have a low voltage that is below a low voltage threshold which the battery voltage must be above in order to allow regular charging or device turn-on. When the battery in such a low voltage state and the external power supply is connected to the standardized data connector, the state can transition from state 302 to state 326. In state 326 the internal charge controller can determine that the battery is in a state that requires an initial charging regime to bring the voltage up to a level where regular charging can commence, and, later, device turn-on The internal charge controller will prevent device turn-on via an power switch mask circuit and will control an LED via a sharing circuit to indicate charging.

From state 326 the state can transition to state 340 upon the battery voltage reaching a level that allows normal charging, but the battery voltage is still too low to allow regular device turn-on. Accordingly, when, in state 326, the battery voltage rises to a charging threshold level, transition 342 occurs. However, state 340 can also be transitioned to from state 302 upon connection of an external power source to the standardized data connector, as indicated by transition 343 while the battery voltage is in the intermediate state between the charging threshold and a limited turn-on threshold that allows display of the battery status (rather than just the LED indicator, which may be turned off upon reaching state 310) while minimizing battery drain. Likewise, if the external power source is removed from the standardized data connector while in state 340, the state will transition back to state 302 as indicated by transition 344.

Transition from state 340 to state 310, as indicated by transition 332, will occur when the battery is sufficiently charged for the charge controller to command the device to a limited on state for the purpose of displaying (via the host processor) a battery state of charge icon or other simple, low-current indication. Transition from state 310 to the intermediate state 340 cannot occur. Transition from state 340 back to 326 can occur if some unknown load drains the battery faster than the internal charge controller or external charger can charge, causing the battery internal discharge protection to open.

In state 302 it is assumed that a battery is attached to the device, or that the device is coupled to an external power source without a battery present. While in state 302 with a battery attached to the device and the battery voltage is in a normal operating range while the device is turned on, the internal charge controller will periodically communicate the charge status to the device host processor so that the display of charge status can be updated. If, in state 302 with a battery attached to the device and the device is turned off, and while the battery voltage is too low (e.g. would be in state 326 is an external power source were connected) then the internal charge controller will mask the device power switch in state 302 to prevent device turn on. If the battery is removed from the device and no external power source is connected to the device, then the state transitions to state 346, as indicated by transition 348. In state 146 the internal charge controller is off as there is no power to the device. If a battery is then connected to the device, or an external power source is connected to the device, the state can return to state 302, as indicated by transition 350.

Figure 4:
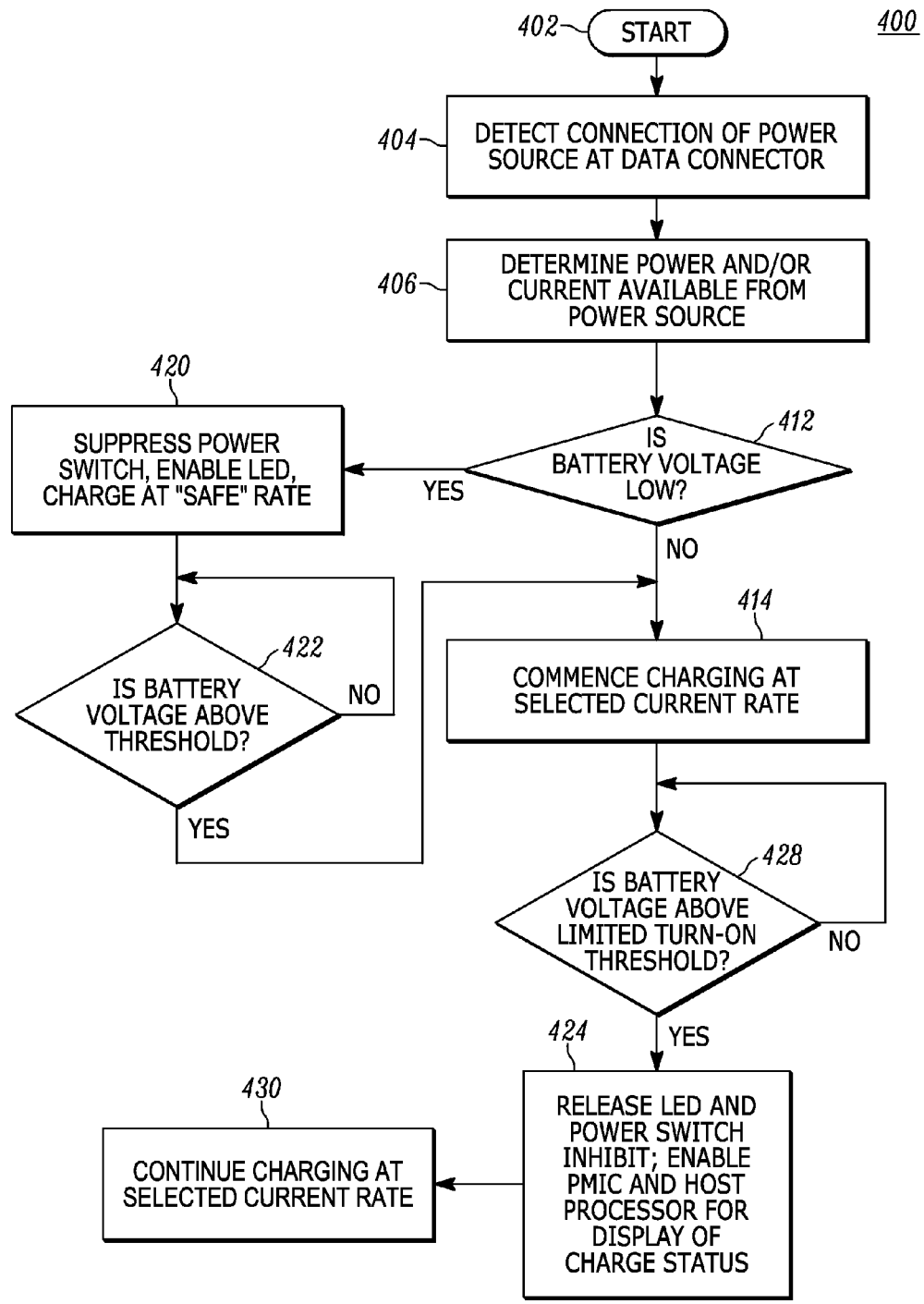
FIG. 4 is a flow chart diagram of a method of operating an internal charging system in accordance with some embodiments.

FIG. 4 is a flow chart diagram of a method 400 of operating an internal charging system in accordance with some embodiments. At the start 402 the device and battery are not connected to any charger or external power source. The internal charge system can be substantially similar in design and function as that shown in FIG. 3, and operates inside a device to charge regulate and control charging of a battery used to power the device when an external power source is connected to the device through a connector such as a standardized data connector or equivalent. At step 404 an external power source is connected to the standardized data connector of the device, which is detected by the internal charge controller. In step 404 the internal charge controller determines the power and/or current that can be sourced from the external power source. In some embodiments this can be performed by determining whether the data lines are shorted together, indicating the external power source is a dedicated power source, or whether the external power source is a data device such as a computing device. Based on the ability of the external power source to source current, as determined in step 406, the internal charge controller selects a current rate to be used for normal charging. The selected current rate can be the maximum current that can be sourced by the external power source, or a level reduced from the maximum current in order to ensure the voltage level provided by the external power source does not drop due to excessive demand.

In step 412 the internal charge controller can determine whether the battery voltage is below a low voltage threshold. If not, then the method can proceed to step 414 where the battery is charged at the selected current rate using an otherwise normal charge regime as controlled by the internal charge controller. If the battery voltage is below the low voltage threshold in step 412, then the method proceeds to step 420 where the internal charge controller suppresses the power switch so that the device cannot be turned on, and it enables a visual indicator such as an LED. The battery is then charged at an initial or "safe" rate to prevent damage to the battery. The normal charge status indicator can be rendered inoperable in this state by preventing the power management circuit from being turned on as well. In step 422 the battery voltage can be periodically tested to determine whether it is sufficiently high enough to allow normal charging. If not, then the process loops back to be repeated (or until the external power source is removed). Once the battery voltage rises to a sufficient level, the method 400 can proceed to step 414. In some embodiments the battery voltage can be between the low battery voltage and a limited turn on threshold voltage required to fully operate the device, as indicated, for example, in state 340 of FIG. 3. In which case turn-on of the device continues to be disabled. Furthermore, it will be appreciated by those skilled in the art that the processes involved in step 412 can be performed prior to steps 404, 406. Likewise, if the battery voltage is below the low battery voltage where turn on of the device is to be masked, then the power switch can be masked prior to steps 404, 406 occurring.

In step 414, as mentioned, normal charging commences at a rate based on the ability of the external power source to source current, and based on charging parameters retrieved from the battery. The internal charge controller can operate a single stage DC to DC regulator to generate a voltage higher than that provided by the external power source in order to charge the battery, and the selected current can be based on the power available as well as the maximum current available since the single stage DC to DC regulator cannot output more power than the external power source can provide. In other words, the output current of the single stage DC to DC regulator in boost mode may have to be cut back in order to avoid overloading the external power source. Furthermore, in step 414, the device can be either off or on (assuming it was on at step 402). When the device is on, the power management and host processor will be operating normally. When the device is turned off, the internal charge controller can detect that power is not provided to the host processor.

In step 428 the battery voltage can be periodically tested to determine whether it is sufficiently high enough (i.e. above a limited turn-on threshold) to allow limited turn-on. If not, then the process loops back to be repeated (or until the external power source is removed). Once the battery voltage rises to a sufficient level, the method 400 can proceed to step 424 where the internal charger controller releases the LED and power switch inhibit functions, enable the power management circuit and host processor for display of the charge status, and proceeds to step 430. In step 430 normal charging continues at a rate based on the ability of the external power source to source current, given that some of this current will be used by the PMIC, host processor, and associated circuitry to display charge status.

Accordingly, a device having an internal charging system with an internal charge controller in accordance with the examples described herein provides the benefit of being able to charge a battery having a higher operating voltage than the voltage provided by an external power source. One example where such an arrangement and circuit is useful is when charging is performed with power provided by a USB source, such as either dedicated USB charging power source, or a USB connection provided by a data device such as a computer. The device and methods exemplified by the foregoing drawings and accompanying text also provides the benefit of indicating to a user the charge status of the battery when the device is turned off, as well as giving a visual indication that a charging operation is occurring when the battery voltage is so low that the device cannot be turned on even to operate the normal charge status indicator.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Additionally, reference to a standard, such as a standard recognized in industry that is well known to those skilled in the art, should be understood as referring to such standard as it existed at the time of filing this application.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An internal charger system for an electronic device, comprising:
    an internal charge controller that determines a maximum current output of an external power source connected to the electronic device at a standardized data connector and a selected current rate based at least in part on the maximum current output of the external power source and charging parameters retrieved from the battery;
    a single-stage direct current (DC) to DC regulator coupled to the standardized data connector that generates the selected current rate from the external power source at a charging voltage, wherein the charging voltage is based on a battery voltage of a battery connected to the electronic device; and
    the internal charge controller is coupled to the single-stage DC to DC regulator and controls the single-stage DC to DC regulator to charge the battery connected to the electronic device at the charging voltage and at the selected current rate according to a charge regime controlled by the internal charge controller.

2. The internal charger system of claim 1, wherein the electronic device further comprises a dedicated set of charging contacts to allow an external battery charger to charge or discharge the battery, the internal charge controller is coupled to the dedicated set of charging contacts and monitors charging of the battery by the external battery charger and reports battery charge status to a host processor of the electronic device.

3. The internal charger system of claim 1, wherein the single-stage DC to DC regulator is a single stage buck/boost regulator.

4. The internal charger system of claim 1, wherein the single-stage DC to DC regulator is a buck regulator.

5. The internal charger system of claim 1, wherein the single-stage DC to DC regulator is a linear regulator.

6. The internal charger system of claim 1, further comprising:
    a mask circuit that is enabled by the internal charge controller to prevent a power management circuit of the electronic device from being turned by or responsive to a user input when the battery voltage indicates the battery is below a low voltage threshold.

7. The internal charger system of claim 6, wherein the battery voltage rising above a low voltage threshold, the internal charge controller commands the electronic device to a limited turn-on state, the method further comprising:
    disabling the mask circuit; and
    enabling a visual indicator of the electronic device to indicate that the battery is being charged, after the mask is removed.

8. The internal charger system of claim 1, further comprising:
    a voltage source that is connected to a host processor of the electronic device and to the internal charge controller, and that provides power to the host processor when the electronic device is turned on, wherein the host processor communicates with a power management circuit when it is powered by the voltage source;
    the internal charger system further comprises a turn-on circuit that is connected to the power management circuit, wherein the internal charge controller enables the turn on circuit to provide a limited turn-on signal to the power management circuit when power from the voltage source to the host processor is turned off responsive to a user input while the external power source is connected to the standardized data connector.

* * * * *